(12) United States Patent
Yang et al.

(10) Patent No.: US 6,445,369 B1
(45) Date of Patent: Sep. 3, 2002

(54) LIGHT EMITTING DIODE DOT MATRIX DISPLAY SYSTEM WITH AUDIO OUTPUT

(75) Inventors: Edward S. Yang, Menlo Park, CA (US); Grantham Kwok-Hung Pang; Chris Sun-Kin Yeung, both of Hong Kong (CN); David Yang, Menlo Park, CA (US); Michael Kin-Ming Hong, Hong Kong (CN); To-On Kwan, Hong Kong (CN); Chi-Ho Chan, Hong Kong (CN); Ka-Lim Ho, Hong Kong (CN); Lawrence Ming-Him Ko, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 0 days.

(21) Appl. No.: 09/251,527

(22) Filed: Feb. 17, 1999

Related U.S. Application Data

(60) Provisional application No. 60/075,478, filed on Feb. 20, 1998, and provisional application No. 60/075,456, filed on Feb. 20, 1998.

(51) Int. Cl.[7] .................................................. G09G 3/32
(52) U.S. Cl. ...................... 345/82; 345/39; 340/825.82; 359/149; 359/181
(58) Field of Search ................................ 359/109–199, 359/149, 181; 345/1.2, 2, 39, 82; 455/608; 250/251; 364/514 R; 375/200; 340/825.82

(56) References Cited

U.S. PATENT DOCUMENTS

| 4,912,524 | A | * | 3/1990 | Nakamura et al. | .......... 455/608 |
|---|---|---|---|---|---|
| 5,202,567 | A | * | 4/1993 | Hamanaka | ................... 250/551 |
| 5,546,209 | A | * | 8/1996 | Willner et al. | ............... 359/115 |
| 5,594,462 | A | * | 1/1997 | Fishman et al. | ................ 345/2 |
| 5,629,868 | A | * | 5/1997 | Tessier et al. | .......... 364/514 R |
| 5,815,127 | A | * | 9/1998 | Jacobs et al. | ................... 345/2 |
| 5,946,343 | A | * | 8/1999 | Schotz et al. | ................ 375/200 |
| 6,208,445 | B1 | * | 3/2001 | Reime | ......................... 359/146 |
| 6,271,815 | B1 | * | 8/2001 | Yang et al. | .................... 345/82 |
| 6,307,527 | B1 | * | 10/2001 | Youngquist et al. | .......... 345/39 |

* cited by examiner

Primary Examiner—Steven Saras
Assistant Examiner—Srilakshmi K. Kumar
(74) Attorney, Agent, or Firm—Pennie & Edmonds LLP (57) ABSTRACT

A dot matrix display system made up of light emitting diodes (LED's), n which one or more LEDs are modulated and encoded with audio information or messages is disclosed. The system has a LED dot matrix display panel with an interface circuit to a computer, an audio signal transmitter, and a receiver. An executive program runs on the computer for the visual display control of characters, decorative pattern or messages on the display panel. The receiver combined with a speaker is located at a distance from the display panel. The receiver is designed to demodulate the optically transmitted audio information and broadcast the messages with the speaker. The modulation of the LEDs includes a voltage-controlled oscillator (VCO) for varying the frequency of on/off periods of said light emitting diodes. The frequency is high enough such that the perceivable light appears to be constantly illuminated to the human eye.

19 Claims, 12 Drawing Sheets

LIGHT EMITTING DIODE DOT MATRIX DISPLAY SYSTEM WITH AUDIO OUTPUT

RELATED APPLICATIONS

The present application claims the priority of U.S. provisional patent applications Ser. No. 60/075,478, entitled "Light Emitting Diode Dot Matrix Display System With Audio Output," and Ser. No. 60/075,456, entitled "Audio Information System Using Light-emitting Diodes," both of which were filed Feb. 20, 1998.

FIELD OF THE INVENTION

The present invention relates to a dot matrix display system. More particularly, the invention relates to a dot matrix display system of light-emitting diodes to simultaneously display a visual image and transmit audio information from one location to another location.

BACKGROUND OF THE INVENTION

Light-emitting diodes (LEDs) are superior than incandescent lights because of LEDs' long life expectancy, high tolerance to humidity, low power consumption and minimal heat generation. LEDs are used in many message display boards, signal devices; and other means of illumination. LED array display board is a popular instrument for commercial usage. Many banks, shops and cinemas are willing to install one piece of it because of its versatility. LED array display board can be very bright and eye-catching. Thus, it is very suitable for advertising purpose. Also, unlike printed sign or logo, the message displayed on the LED array display board can be changed anytime. One can use it to tell people what is the most updated information in real-time. For example, the LED array display board is used in a bank to show the current stock market value, currency exchange rate and interests rate. It can also be used in a shop to tell people what open hours are and what the biggest bargain is today.

The features and functionality of a LED array display board also becomes more enriched. Scrolling, blinking, built-in character formats are just some basic functions. More powerful LED array display board even has a multi-color display. The resolution is enhanced by reducing the dot size and have the LED packed more closely. The size of the LED array also becomes larger and larger. The smallest LED array starts with a single line text display. But some huge LED array display boards can be taller than a man and have a multi-line text and even graphics display. Nevertheless, existing LED display board is limited only to visual message (or image) displays. It has never been used for other functions.

However, one important characteristic of LEDs is that they are semiconductor devices. and are capable of fast switching with the addition of appropriate electronics. Thus, it is possible to use a LED display system for both visual display and broadcast of audio information through LEDs if lights emitted from LEDs can be modulated and encoded.

SUMMARY OF THE INVENTION

It is therefore an object of the present invention to use LEDs as a communication device for displaying an image and transmitting audio information.

It is also an object of the present invention to provide a dot matrix display system using light-emitting diodes to display an image and to transmit audio information through light emitting diodes from one location to another location.

It is yet another object of the present invention to provide an information system for use in a wireless optical communication system.

The present invention discloses the use of LED lights for providing a visual signal in the form of visible light rays and for using the visible light rays to transmit and broadcast audio information. According to a first embodiment of the invention, a light emitting diode dot matrix display system for transmitting audio information from a first location to a second location comprises a transmitter at the first location and a receiver at the second location. The transmitter comprises at least one light emitting diode for producing the visible light rays, a power source for the light emitting diode, means for coupling the audio information to the light emitting diode and a modulator connected to the light emitting diode for modulating the frequency of ON and OFF periods of the light emitting diode. The light emitting diode dot matrix display system may further comprise an audio information source for providing the audio information. In a preferred embodiment of the invention a CD player or a cassette-player is used with the transmitter as the audio information source to provide the audio information. The modulator includes a voltage-controlled oscillator connected with the audio information source for modulating the frequency of the audio information so that a modulated carrier frequency is proportional to the amplitude of the audio information. It is preferred that a plurality of light emitting diodes are used to convert the modulated audio information into a train of ON/Off signals and to transmit thereof. The power source for the transmitter is a dc source, preferably with a voltage less than 10 volts. A buffer circuit is also used to drive the light emitting diode.

The receiver of the light emitting diode dot matrix display system comprises a photodetector for receiving the visible light rays emitted from the light emitting diode and a demodulator connected to the photodetector for demodulating the visible light rays to retrieve the audio information. The light emitting diode dot matrix display system may further comprise at the receiver a lens system for focusing the visible light rays onto the photodetector and a speaker connected to the demodulator for broadcasting the audio information. In an preferred embodiment of the invention, the photodiode is used as the photodetector for detecting the visual light rays from the transmitter and converting the same into an electrical signal. A limiting preamplifier is connected to the photodetector for amplifying the electrical signal. A virtual ground is provided with the limiting preamplifier for biasing and comparison. A data reproducing circuit is connected to the limiting pre-amplifier for producing rectangular pulses from the amplified electrical signal. A differentiator circuit is connected to the data reproducing circuit for producing pulses according to the rectangular pulses. A pulse generator converts the pulses from the differentiator circuit into sharp pulses, and an integrator and envelope detector thereafter demodulates the sharp pulses. A band-pass filter is connected to said integrator and envelope detector for smoothing out signal distortions therefrom to produce the audio information. Finally, a power amplifier is used to amplify the audio information from the band-pass filter.

In a second embodiment of the invention, the light emitting diode dot matrix display system for simultaneously displaying a visual signal and transmitting an audio signal comprises a dot matrix display panel having a row and a column of light emitting diodes, an interface circuit connected to the dot matrix display panel, a visual signal display controller connected to the interface circuit for controlling display of the visual signal on the display panel, an audio signal transmitter connected to the interface circuit for providing a modulated audio signal to the light emitting diodes, and a receiver for receiving light emitted from the light emitting diodes and retrieving the audio signal therefrom. The interface circuit includes a driver circuit for the light emitting diodes of the display panel. In a preferred embodiment of the invention, the visual signal display controller is an executive program executed on a computer. The interface circuit comprises a system control block connected to a parallel port of the computer for providing a timing control and maintaining a count of pulses of the modulated audio signal. An address generator is connected to the system control block for transforming frequency of the modulated audio signal to a scanning frequency for use in the row of light emitting diodes. A random access memory connected to the address generator contains design information of the visual signal to be displayed on the LED display panel. The interface circuit also has a PC data buffer connected to the parallel port of the computer, a column signal buffer connected between the address generator and the dot matrix display panel, and a row signal buffer connected between the random access memory and the dot matrix display panel. The audio signal transmitter comprises a voltage-controlled oscillator for varying the frequency of ON/OFF periods of the light emitting diode. The receiver comprises a photodiode for receiving light from the light emitting diodes and a demodulator connected to the photodiode for demodulating the light to retrieve the audio signal.

For a more complete understanding of the invention, its objects and advantages, reference may be made to the following specification and to the accompanying drawings.

DETAILED DESCRIPTION OF THE INVENTION

The present invention has achieved a modulation of visible light rays emitted by LEDs for transmission of audio information from a first location to a second location.

Figure 1:
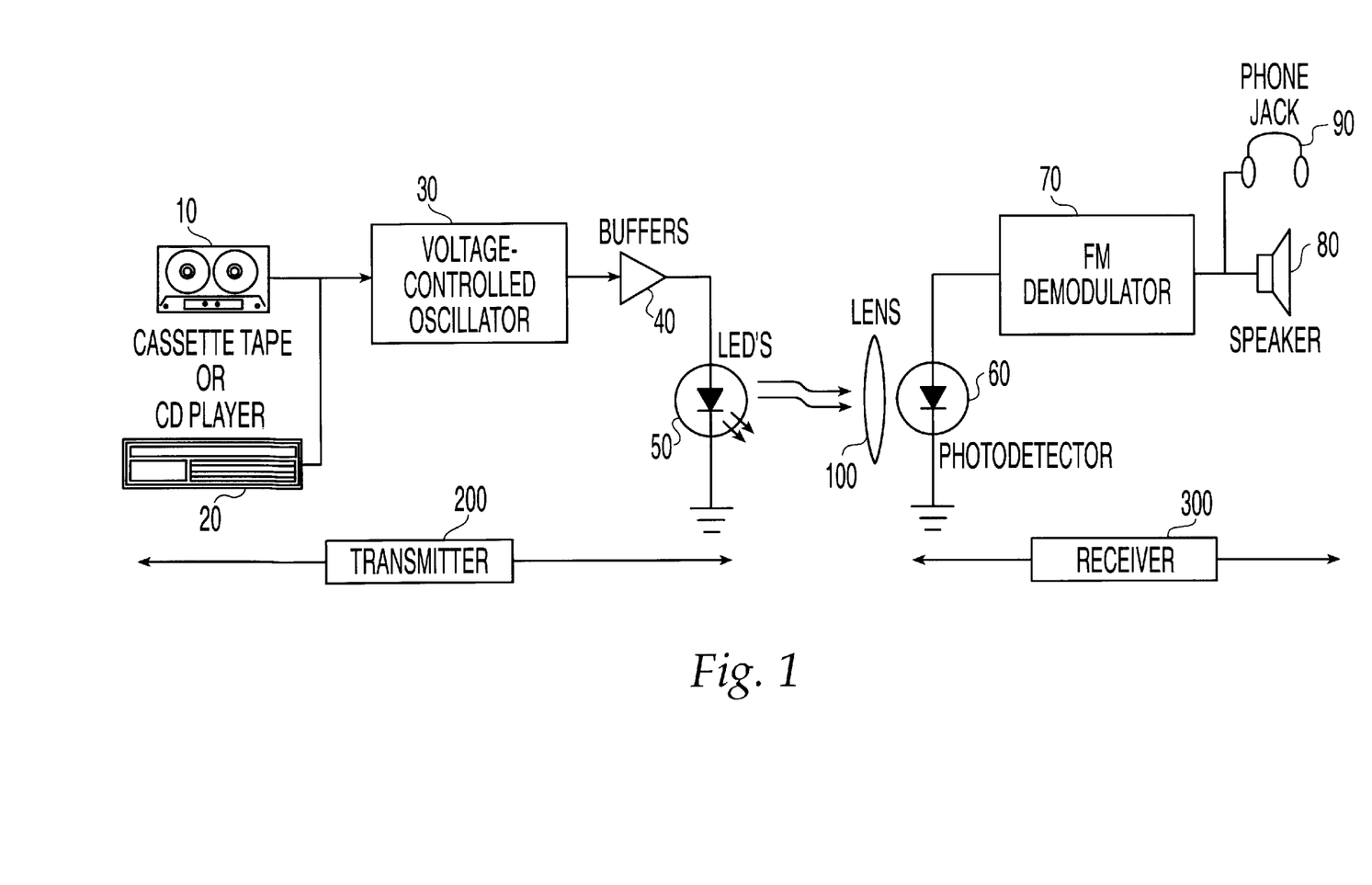
FIG. 1 is a block diagram of a first embodiment of the LED dot matrix display system of the invention having a transmitter and a receiver.

In a first embodiment of the invention as depicted in FIG. 1, the light emitting diode dot matrix display system comprises a transmitter 200 and a companion receiver 300. Both the transmitter and the receiver are supported by low voltage d.c. powers. The voltage for the d.c. power for example is less than 10 volts.

The transmitter according to FIG. 1 comprises a voltage-controlled oscillator (VCO) 30, a buffer circuit 40 and LEDs 50. A cassette tape-player 10 or a CD player 20 is used as an audio signal source to generate an audio signal such as voice messages or music signals. The VCO 30 is connected with either the cassette tape-player 10 or the CD player 20 to perform frequency modulation (FM) on the audio signal so that a modulated carrier frequency is proportional to the amplitude of the audio signal. The buffer circuit 40 is used to drive the LEDs 50 with sufficient currents in order to have more efficient emission of visible light rays. The LEDs 50 convert the modulated audio signal output from VCO into a train of ON/OFF optical signals in the form of visible light rays and transmit to the receiver 300.

The receiver of this preferred embodiment comprises a photodetector 60 and a FM demodulator 70. The photodetector 60 detects the optical signals emitted from the LEDs of the transmitter and converts them into electrical signals. It is preferred that the optical signals from the LEDs are collected through a collection lens 100 which is located before the photodetector 60. The FM demodulator demodulates the electrical signals from the photodetector to retrieve the audio signal delivered to the transmitter originally. A speaker 80 or a head phone/ear jack 90 is connected to the FM demodulator for delivering the audio signal. The receiver is powered by battery or any electrical system.

Figure 2:
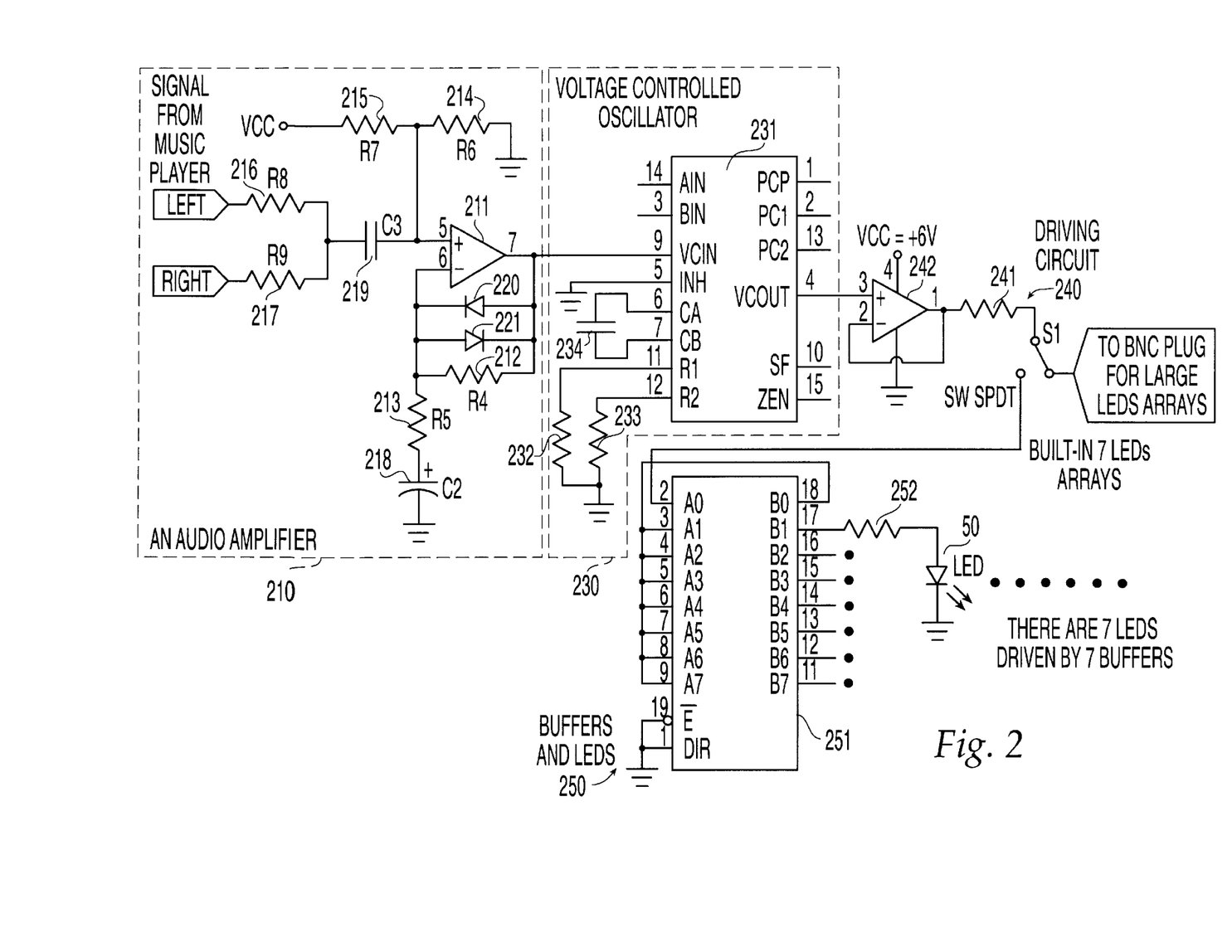
FIG. 2 is a circuit schematic of one transmitter circuit design of the invention.

FIG. 2 is a schematic diagram of a transmitter circuit design used in the preferred embodiment of the present invention. The audio signal from the cassette tape-player or CD player has a small amplitude and hence amplification of this audio signal is necessary. An audio amplifier circuit 210 receives and amplifies the audio signal from the cassette tape-player or CD player and shifts the average voltage level of the audio signal to an appropriate level in the meantime so that the amplitude of the audio signal is suitable for inputting to the VCO. The audio amplifier circuit 210 includes six resistors 212(R4), 213(R5), 214(R6), 215(R7), 216(R8), and 217(R9), two capacitors 218(C2) and 219(C3), an operational amplifier 211, and two diodes 220 and 221. The audio signal comes from the audio signal source with left and right channels. Two resistors 216 and 217 (R8 and R9 respectively) are used as loadings respectively for the two channels. In a normal volume of sound, the audio signal has a voltage swing which is different from the output signal going to the VCO. The audio amplifier circuit has a voltage gain of:

$$1 + \frac{R4}{R5}$$

The supply voltage is Vcc. The average voltage level is also adjusted and shifted from the 0V. This is carried out with resistors 214 and 215 with the average voltage level calculated as follows $$\frac{R6}{R6 + R7} \times V_{cc}$$

Diodes 220 and 221 are used to limit the input signal in a desired range.

A VCO circuit 230 between nodes A and B in FIG. 2 performs a FM modulation on the audio signal output from the audio amplifier circuit 210 in accordance with the change in the voltage level of the audio signal. A VCO chip 231 is used. A rectangular/square wave VCO is used instead of sine wave because there are only two states (ON and OFF) for the LEDs. The carrier frequency is set at 100 kHz with a maximum frequency deviation of ±50 kHz. In the design, INH (pin 5 of the VCO chip) is connected to the ground to enable the VCO function. By adjusting resistors 232 and 233 and a capacitor 234, the center frequency and frequency deviation are determined. The modulated signal is then transmitted by the switching of the LEDs. The frequency of switching is high enough such that the perceivable light appears to be constantly illuminated to the human eye.

A driving circuit 240 between nodes B and C in FIG. 2 includes an operational amplifier 242 and a resistor 241. A voltage follower is used to give high input impedance and low output impedance. In this preferred embodiment of the present invention, a switch is included so that the transmitter uses seven LEDs or a large LED with 133 LEDs for transmission. Resistor 241 for matching to the line is important for maximum power transfers. Therefore, a driving circuit with resistor 241 is used to achieve the resistor matching.

To ensure that the output from the VCO has sufficient power to drive the LEDs, a buffer circuit 250 is used to provide an optimal operating RMS current to the LEDs in order to achieve a maximum transmission efficiency. The buffer circuit 250 in FIG. 2 includes a tri-state buffer chip 251 and a resistor 252. The resistor 152 provides a nominal driving current for each LED 50.

Figure 3:
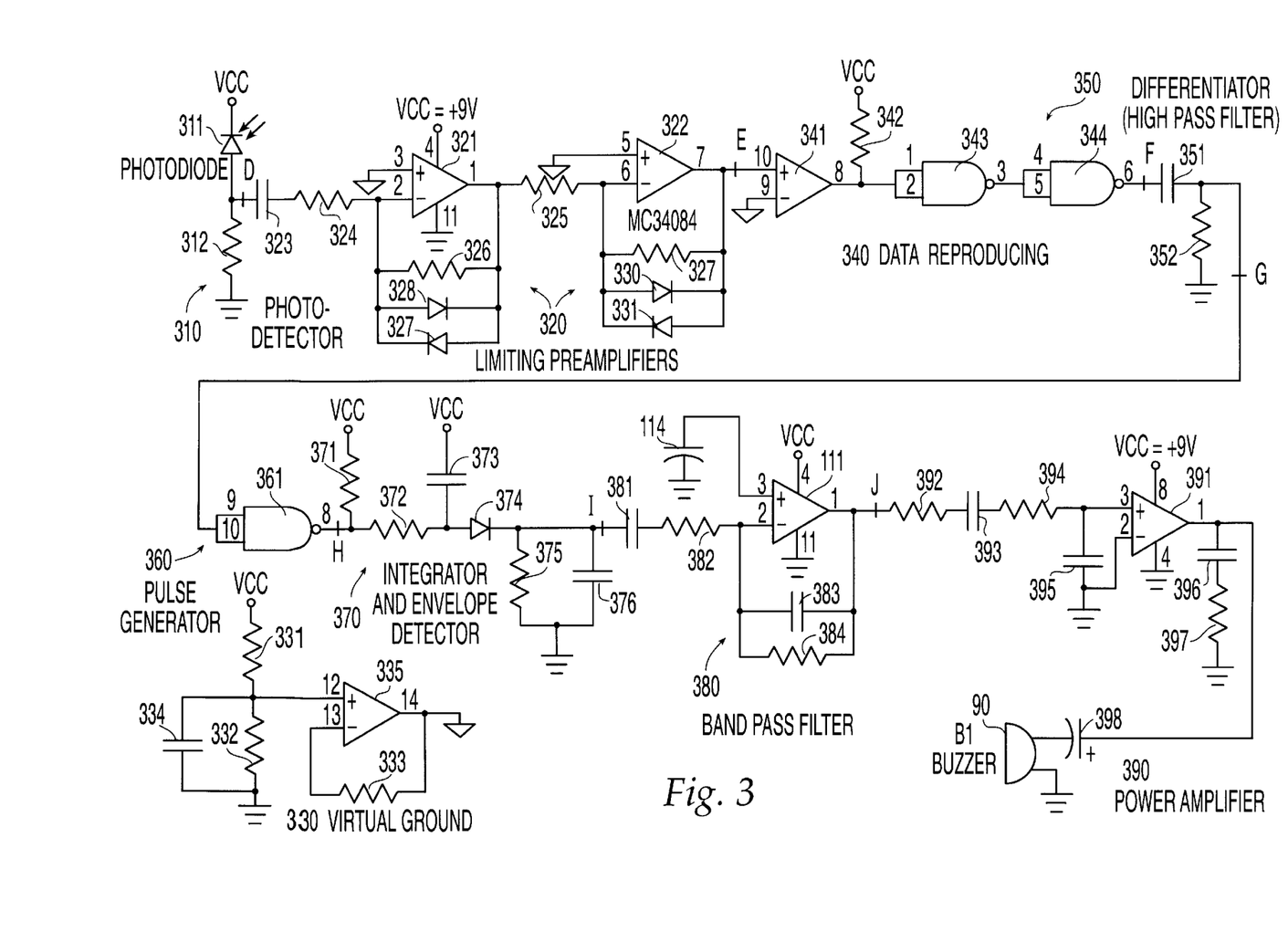
FIG. 3 is a circuit schematic of one receiver circuit design of the invention.

Likewise, a schematic diagram of the receiver circuit design used in the preferred embodiment is depicted in FIG. 3. The receiver comprises nine circuit blocks listed as follows: a photodetector circuit 310, a limiting pre-amplifier circuit 320, a data reproducing circuit 340, a differentiator or high-pass filter circuit 350, a pulse generator circuit 360, an integrator and envelop detector circuit 370, a band-pass filter circuit 380, a power amplifier circuit 390 and a virtual ground circuit 330. The detailed descriptions of these circuit blocks are now provided below.

The photodetector circuit 310 comprises a photodiode 311 and a resistor 312. The photodetector receives and detects the light signal from the transmitter and converts the light signal into the electrical signal. The photodiode is coupled to the resistor 312 and the ground.

Since the electrical signal generated from the photodetector circuit is small, amplification thereof is needed. The limiting pre-amplifier circuit 320 is shown between nodes D and E in FIG. 3 and amplifies the electrical signal output from the photodetector circuit. The limiting pre-amplifier circuit has two op-amplifiers 321 and 322, a capacitor 323, resistors 324, 325, 326, and 327, and diodes 328, 329, 330 and 331, which are connected with a fashion disclosed in FIG. 3. The diodes are used to limit the input voltage level of the electrical signal from the photodetector to a desired level such as between −0.7 V and 0.7 V. Two op-amplifiers are used in this circuit because using one pre-amplifier requires a very high gain amplifier which becomes noisy. In this circuit, two op-amplifiers with lower gain each is used to achieve a high gain but with less noise.

The virtual ground circuit 330 is shown in lower left corner of FIG. 3. It has three resistors 331, 332, and 333, a filtering capacitor 334, and an operational amplifier 335. The virtual ground circuit produces a virtual ground of Vcc/2 where Vcc is the supply voltage. The resistors 331 and 332 have equal resistance and are used as a potential divider with the filtering capacitor 334 for the stabilization of the virtual ground. The virtual ground of Vcc/2 is used in the two operational amplifiers 321 and 322 of the limiting pre-amplifier 320. This can shift the average voltage level to Vcc/2. The gain of amplifier 321 depends on the ratio between resistors 326 and 324. Similarly, the gain of amplifier 322 depends on the ratio between resistors 327 and 325. This virtual ground serves as a reference voltage point for the limiting pre-amplifier stage and the data reproducing stage.

The data reproducing circuit 340 between nodes E and F in FIG. 3 is connected to the limiting pre-amplifier 320 to produce rectangular pulses from the electrical signal amplified by the limiting pre-amplifier. The data reproducing circuit includes an operational amplifier 341, a resistor 342 and two NAND Schmitt triggers 343 and 344. The operational amplifier is used as a comparator with the use of the virtual ground as a reference. The NAND Schmitt trigger gates enhance the noise immunity and correct edges from low to high voltage level due to the slew rate of the operational amplifier. Two NAND Schmitt trigger gates are used instead of one so that the signal is not inverted.

Between nodes F and G of FIG. 3 is provided with the differentiator circuit 350. The differentiator circuit detects leading edges of the rectangular/square pulse signals input from the data reproducing circuit and produces pulses according to the rectangular/square pulses. The differentiator circuit has a high pass filter comprised of a capacitor 351 and a resistor 352. The time constant of the filter is the product of the values of the capacitance and resistance.

The pulse generator 360 as depicted between nodes G and H in FIG. 3 converts th,e pulses from the differentiator circuit 350 into sharp pulses. A Schmitt trigger gate 361 is used as a pulse generator and the output thereof gives the inverted version of the pulses from the differentiator.

The integrator and envelop detector circuit 370 is shown between nodes H and I in FIG. 3. It includes resistors 371, 372, and 375, capacitors 373 and 376, and a diode 374. The integrator is an envelope detector and double integrations are carried out. If the inverted pulses from the pulse generator 360 contain high frequency, the frequency of integration is higher and the voltage level of the output would be higher. However, if the inverted pulses contain low frequency, the frequency of integration is lower and the voltage level of the output would be lower. In this way, the modulated signal would be reconstructed.

Shown between nodes I and J in FIG. 3, the band-pass filter 380 smooths out distortions from the integrator and envelope detector to produce an appropriate waveform. The output signal from the integrator and envelop detector circuit 370 has many distortions. The band-pass filter is used to filter out all the high frequency distortions. The higher cut-off frequency depends on capacitor 381 and resistor 382. A lower cutoff is also used to filter out the low frequency noise such as the 50 Hz power line frequency. The lower cut-off frequency depends on capacitor 383 land resistor 384. The output signal from the band-pass filter at node J is the audio signal.

The final stage of the receiver circuit is the power amplifier circuit 390 which amplifies the audio signal from the band-pass filter so that the audio signal is at a level comfortable for hearing. It has a power amplifier 391, resistors 392, 394 and 397, and Capacitors 393, 395, 396 and 398. The audio signal through the power amplifier circuit can be heard from a speaker or head phone/ear jack 90.

Figure 4:
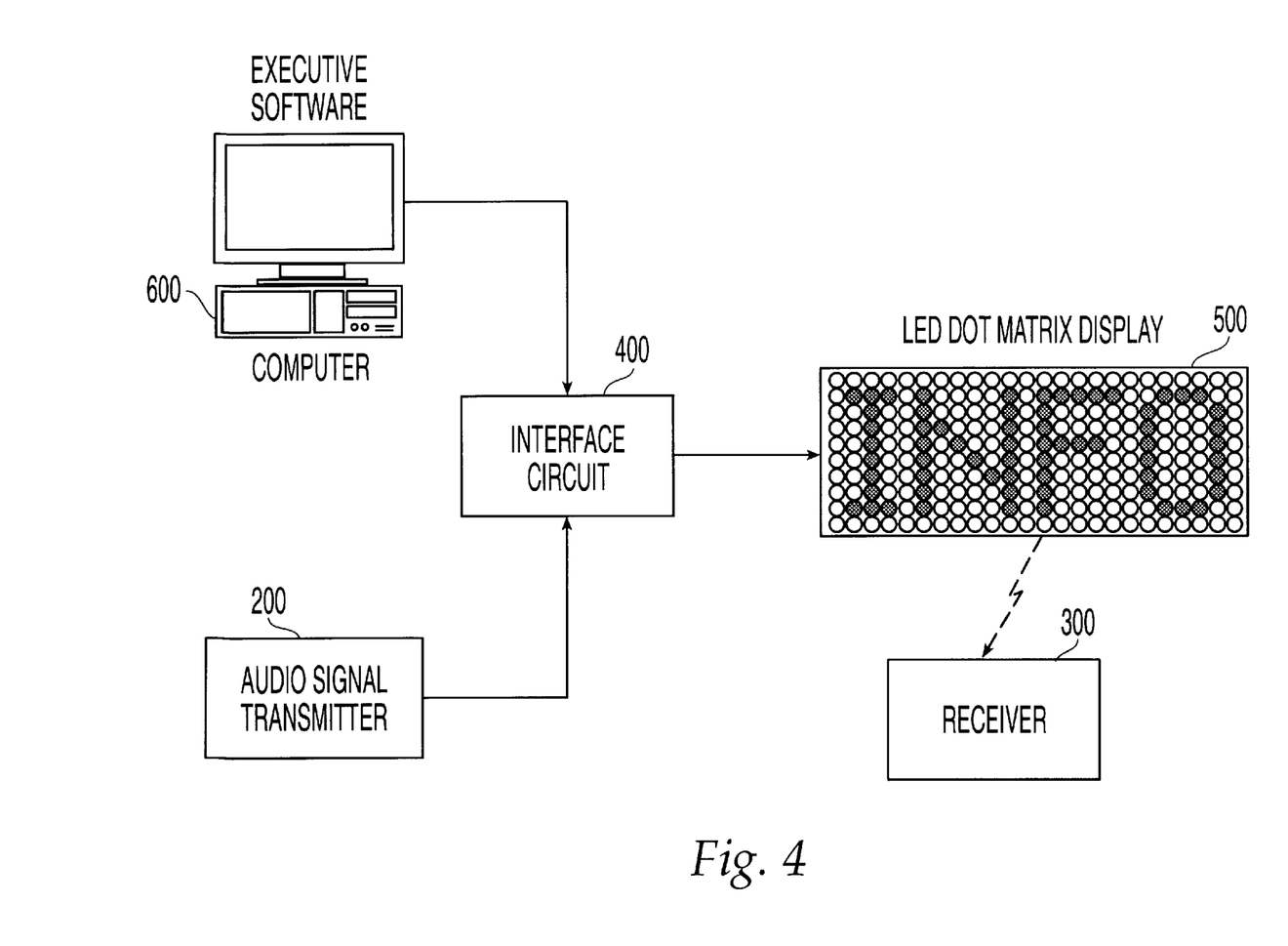
FIG. 4 is a block diagram of a second embodiment of the LED dot matrix display system of the invention having an interface circuit.

Referring to FIG. 4, the light emitting diode dot matrix display system according to a second embodiment of the present invention comprises a LED display panel (or any LED display assembly) 500 for displaying a visual signal in the form of visible light rays and for using the visible light rays to transmit audio information. The LED display panel has a plurality of LEDs. The LED display panel 500 is linked to a computer 600 through an interface circuit 400. An executive program is performed on the computer for the control of the display of the visual signal such as characters, decorative patterns or messages on the LED display panel.

The light emitting diode dot matrix display system further comprises an audio signal transmitter 200 and a companion receiver 300. The audio signal transmitter 200 provides modulation to an audio signal from an audio signal source and transmits the modulated audio signal through the LED display panel. The transmitter comprises an audio signal source such as a cassette tape player or a CD player, a voltage-controlled oscillator (VCO) and buffers as shown in FIG. 1. The cassette tape player or the CD player generates an audio signal such as audio messages or music signals. The VCO is connected to the audio signal source for performing a frequency modulation on the audio signal such that a modulated carrier frequency is proportional to the amplitude of the audio signal. The frequency of on/off periods of light emitting diodes on the LED display panel is high enough such that the perceivable light appears to be constantly illuminated to the human eye. The audio signal is frequency modulated with a frequency range 50–150 kHz. It is a series of square pulses varying in that frequency range.

The receiver 300 in this embodiment comprises a photodetector, a FM demodulator, a speaker or head phone/ear jack, and a collection lens as shown in FIG. 1. Through the collection lens, the photodetector receives and detects the visible light rays emitted from the LED display panel and converts the modulated light signal into an electrical signal. The FM demodulator then demodulates the modulated signal into the original audio signal. The speaker, head phone or ear jack is used for the delivery of the audio messages or music sent from the transmitter 200. Both the transmitter 200 and the receiver 300 further include connection means for receiving d.c. power. The low voltage d.c. source for each is less than 10 volts.

For detailed descriptions of the transmitter 200 and receiver 300 as well as preferred circuit designs used in this second embodiment, please refer to the corresponding parts described above in the first embodiment.

Figure 5:
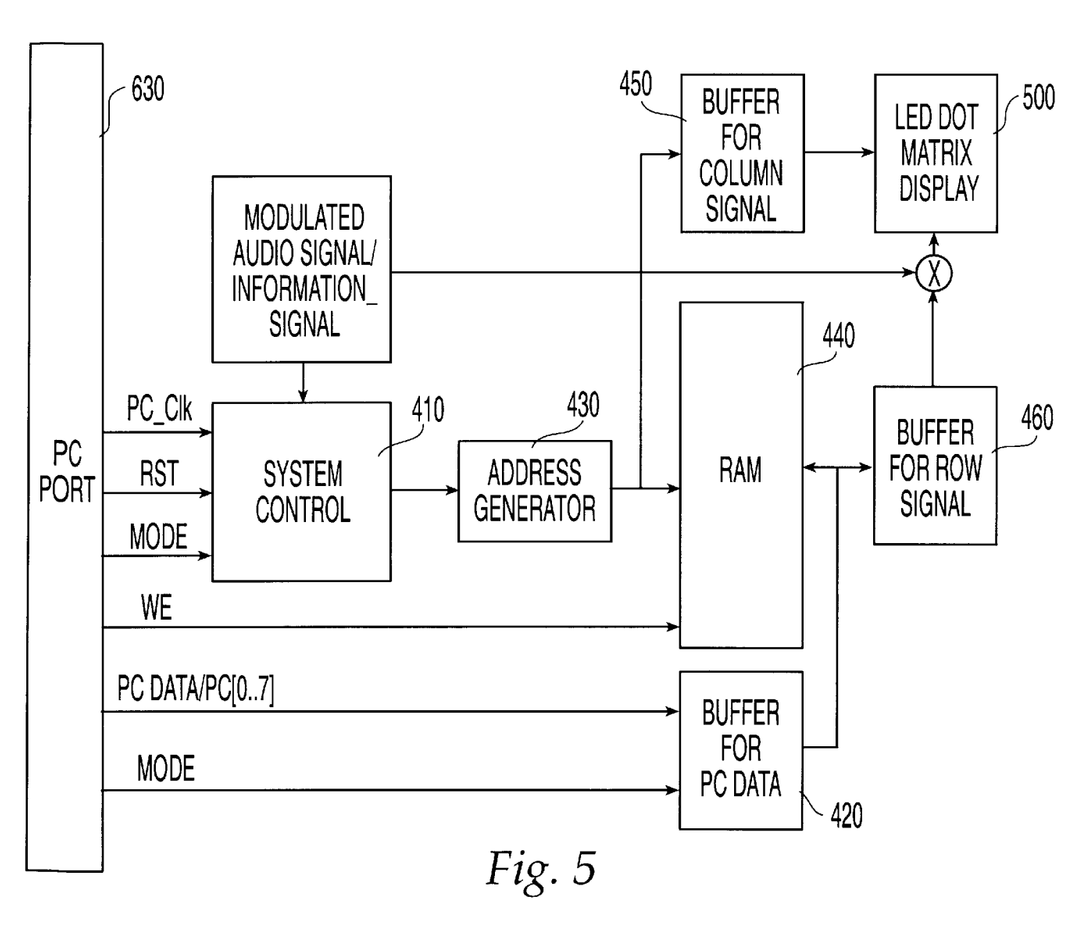
FIG. 5 is a block diagram of the interface circuit used in the second embodiment of the invention.

FIG. 5 provides a block diagram of the interface circuit 400. The interface circuit comprises a system control block 410, an address generator 430, a random access memory (RAM) 440, a buffer for PC data 420, a buffer for column signal, and a buffer for row data 460 connected in a fashion as shown in the figure.

The interface circuit is connected to the computer 600 through a PC parallel port 630 and to the LED display panel 500. The buffer 420 provides a buffer for column signals to be written to the RAM 440 when a write enable (WE) signal is high. Thus, the RAM contains the pattern of characters or any decorative design to be displayed on the LED display panel. The address generator 430 decodes the modulated audio signal frequency to a scanning frequency for the row signals. The modulated audio signal is multiplexed with the column signals to provide the appropriate on/off switching of the light emitting diodes.

There are two modes of operation for the interface circuit, display mode and pattern storage mode. The system control block 410 determines whether the interface circuit is in a display mode or pattern storage mode. When a MODE signal from the PC port is HIGH, the interface circuit is in the display mode of operation which allows the LED display panel to display the visual image according to the executive program. When the MODE signal is LOW, the interface circuit is in the pattern storage mode which allows the computer to download information to the interface circuit.

In the display mode, the modulated audio signal is high and arrives at the system control block 410. The system control block provides a timing control and maintains a count of pulses of the modulated audio signal which cycle between 0 and 7. The address generator 430 generates an 8 bit address from a 3 binary bit for the RAM 440. For example, when a third pulse, which corresponds to the third column, arrives. This pulse is 011 in binary. The address generator converts this 3 binary unit into 11111011. The third bit is low which activates the third column on the common signal through the buffer for column signal 450.

The same eight bit address (e.g. 11111011) is presented to the RAM 440, and it provides the appropriate data for the buffer for row signal 460. The buffer for row signal 460 is a tri-state latch, and the data is sent out when the audio signal pulse is low. For example, the RAM may recall 00010010 and is presented to the buffer 460). Then, when the audio signal pulse becomes low, for the third column of the LED array, the second and the fifth LED is on.

In the pattern storage mode, the MODE signal from the computer is LOW. A reset signal (RST) from the computer goes low as well, and this initializes the address location to zero. The 3-to-8 address generator 430 provides the address 0 for the RAM 440. Then, the computer provides row data PC[0.7] to the RAM 440 through the buffer for PC data 420. A write enable (WE) signal becomes low and the data PC[0.7] is stored to Address 0 of the RAM. A pulse from PC_clk arrives at the counter of the system control block and the address is incremented to Address 1. The 3-to-8 address generator 430 provides another address for the RAM. Again, data PC[0.7] is presented to the RAM and the WE signal becomes low to enable the storage of the data to the RAM. Another pulse from PC_clk arrives at the counter of the system control block 410 and the cycle repeats once again until all eight rows of data has been stored to the RAM. Then the Mode is changed back to HIGH for the display mode.

Figure 6:
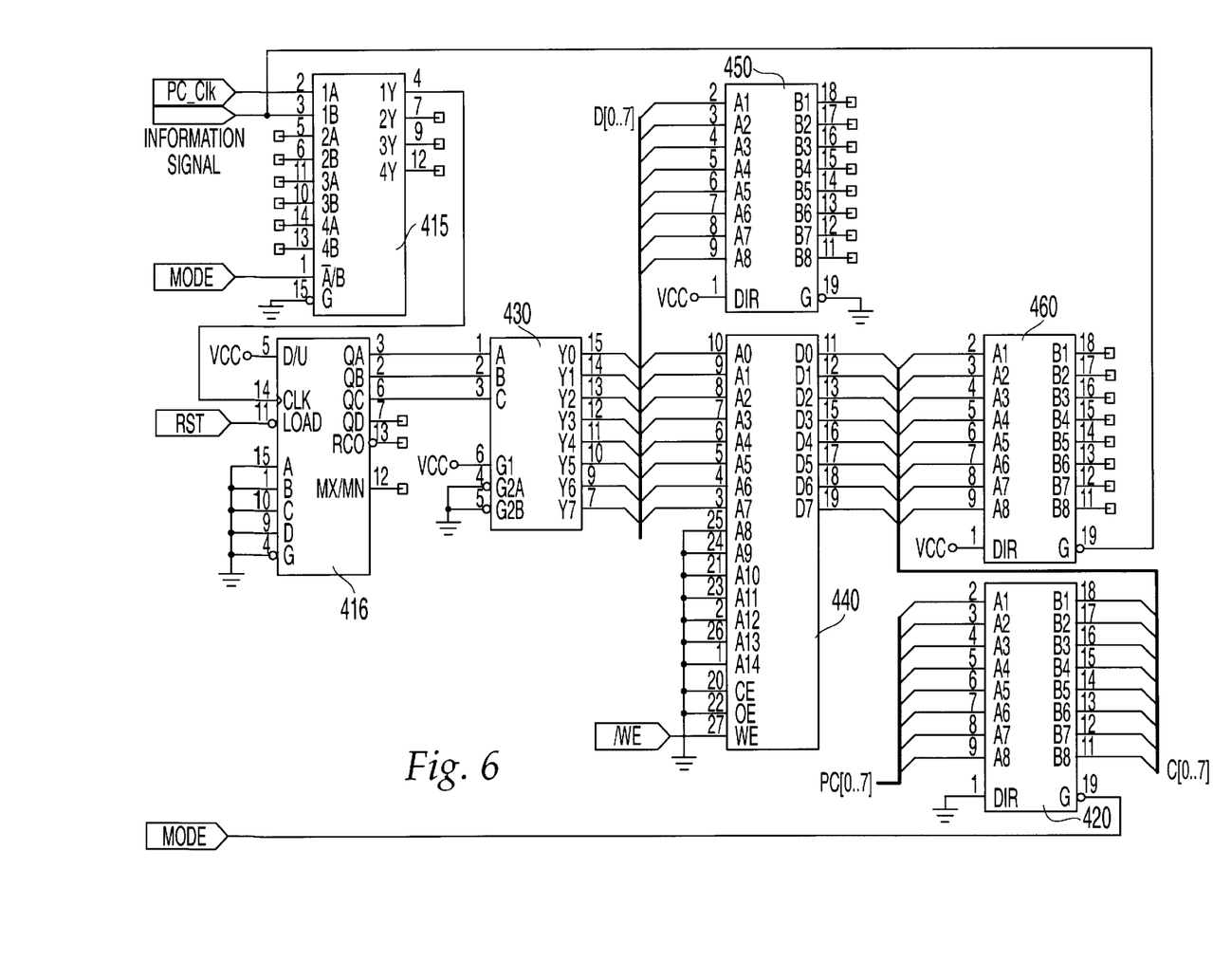
FIG. 6 is a circuit diagram of the interface circuit design of the invention.

A schematic diagram of the interface circuit design is shown in FIG. 6. The system control block 410 comprises a multiplexer 415 and a counter 416. Note that information_ signal input to the multiplexer refers to the modulated audio signal. The multiplexer selects between the display mode and pattern storage mode. The signal "Mode" enables either mode. A combination of the counter and the address generator 430 provides the function of an address generator. In the pattern storage mode, the generated address is for storing the row pattern from the signals PC[0.7]. In the display mode, this address is used to bring the appropriate row signals to high and the corresponding column signals is retrieved from the RAM 440. Buffers 420, 450, 460 are needed to provide sufficient driving currents for the LEDs on the LED display panel.

Figure 7:
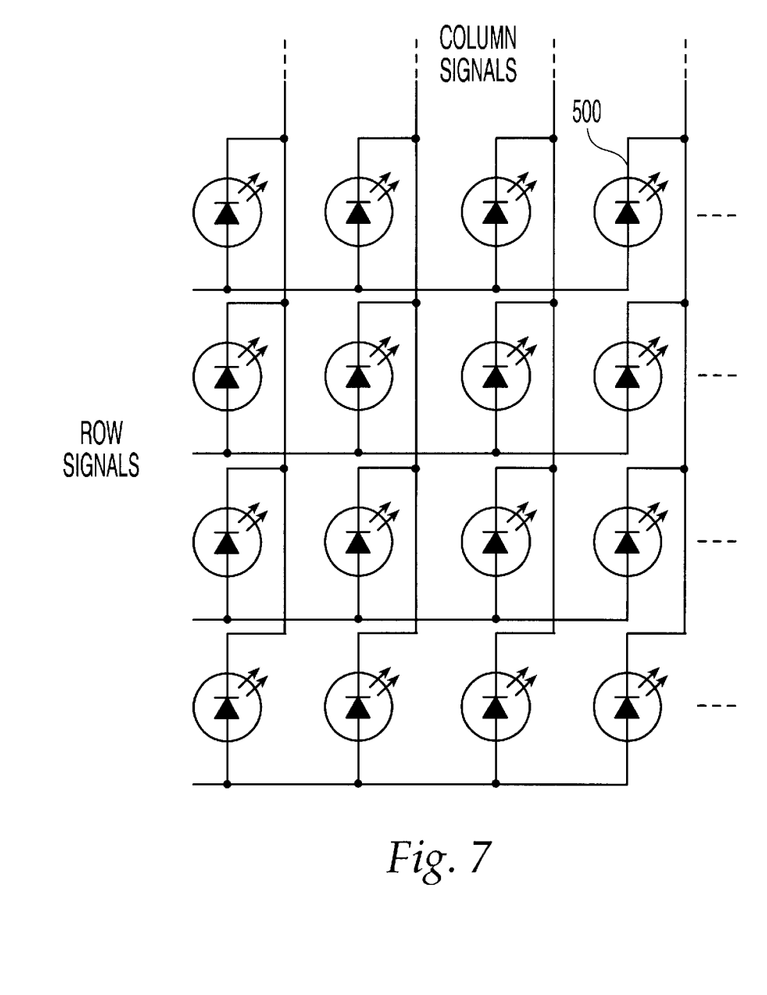
FIG. 7 is a schematic of a dot matrix display used in the second embodiment of the invention.

FIG. 7 illustrates a schematic of a LED dot matrix display used in this embodiment. In order for a light emitting diode to be on, the corresponding row signal should be high and associated column signal should be low.

The primary advantage of the present invention is the provision of an LED display system that utilizes the light emitted from the LEDs to optically transmit audio information to a user with a receiver located some distance away from the display system. The invention emphasizes on the dual use of LED display for both visual display and audio transmission. Hence, the functionality of the dot matrix LED display has been extended and a new generation of LED display has been developed.

Another advantage of the invention is the provision of the use of a software program to control the LEDs in each row and column of the display panel or assembly t display the desired pattern on the dot matrix. The pattern of the characters (Chinese or English), picture, graphics or any decorative pattern is stored in a memory component (RAM) of an interface circuit.

Another advantage of the invention is the provision of a portable receiver which demodulates the optically transmitted signal to obtain the audio information for broadcasting with a speaker, ear jack or head phone. The low voltage dc source for the receiver is less than 10 volts.

Another advantage of the invention is the provision of a wireless communication device for receiving audio signal. The device makes use of the optical part of the EM spectrum which is unregulated by FCC or any countries in the world. The display system coupled with the audio signal receiver can be marketed world-wide and without any license.

Another advantage of the invention is the provision of a specialized hearing device which is designed for short-distance (usually for less than 50 feet) applications. The locations of the LED display system and the receiver are relatively stationary. The application makes use of the directional nature of the communication medium for the receiver requires a line-of-sight to the display system.

Another advantage of the invention is the provision of easy targets for the line-of-sight reception by the receiver. This is because the LEDs on the display panel or assembly, being on at all time, are also indicators of the locations of the transmitter.

Another advantage of the invention is the provision of a transmitter which can broadcast with a viewing angle close to 180 degrees.

The benefits of this invention can be applied to a large variety of applications. The many applications of the above LED display system are as follows.

Figure 8:
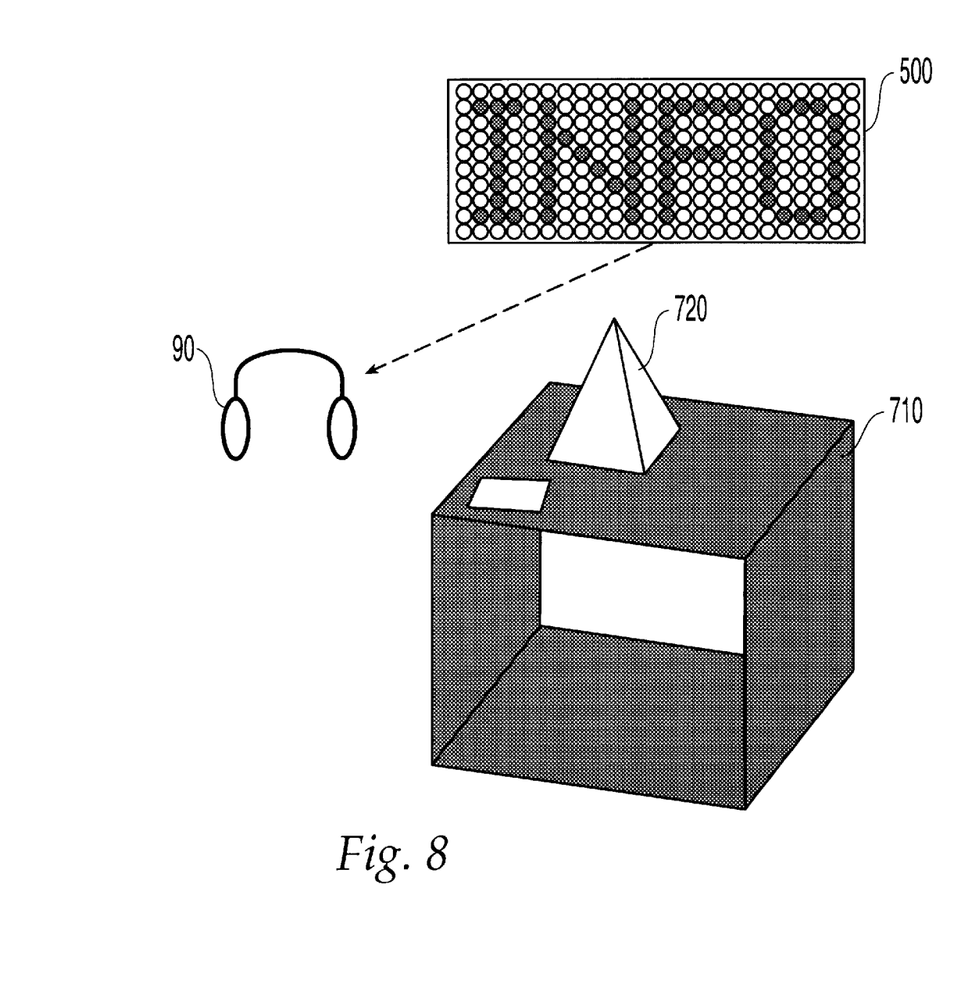
FIG. 8 is a perspective view of the LED dot matrix display system of the invention in a museum environment.

As shown in FIG. 8, a LED dot matrix display panel 500 of the present invention is located near a table 710. Typically, an exhibit or any physical object 720 is placed on the table. The indoor environment could be a room in a museum. A guest holding a portable receiver with an ear jack 90 listens to audio messages transmitted through the LEDs of the dot matrix display. A quiet atmosphere is maintained while the guests strolls around in the room. A major advantage over conventional broadcasting system is that an individual with a receiver has the freedom of choice in receiving specific messages without hearing any unwanted announcement, music or commercials.

Figure 9:
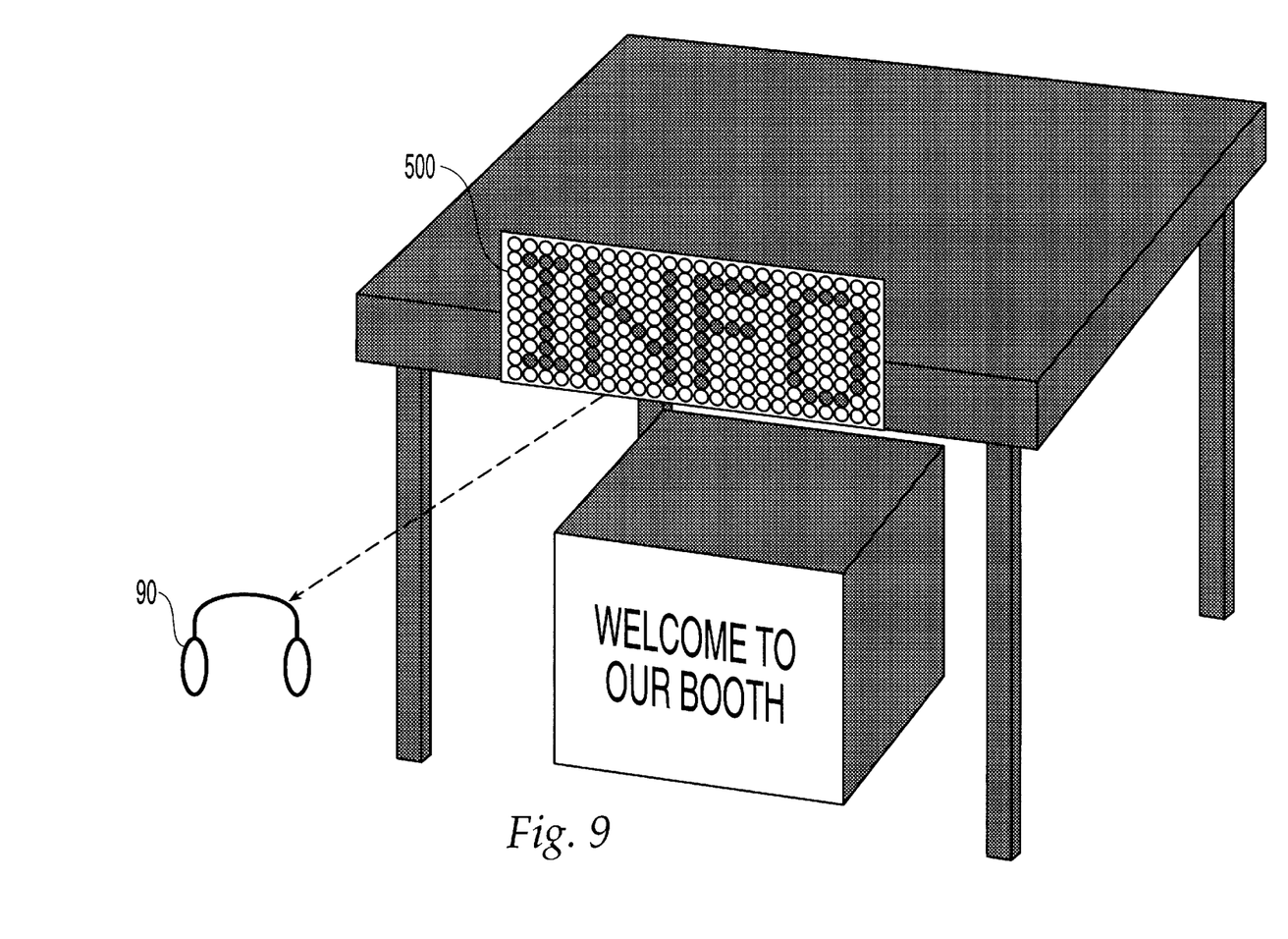
FIG. 9 is a perspective view of the LED dot matrix display system of the invention in an exhibition hall environment.

In a second application in an exhibition hall as shown in FIG. 9, the information on an individual product or specific announcement of the company can be broadcast via a LED dot matrix display system 500 of the present invention. A visitor points the portable receiver to the relevant LEDs on the display panel and listen to the audio messages about the specific announcement with the head phone or ear jack 90 attached to the portable receiver. Thus, the sound level of the exhibition hall is minimized.

Figure 10:
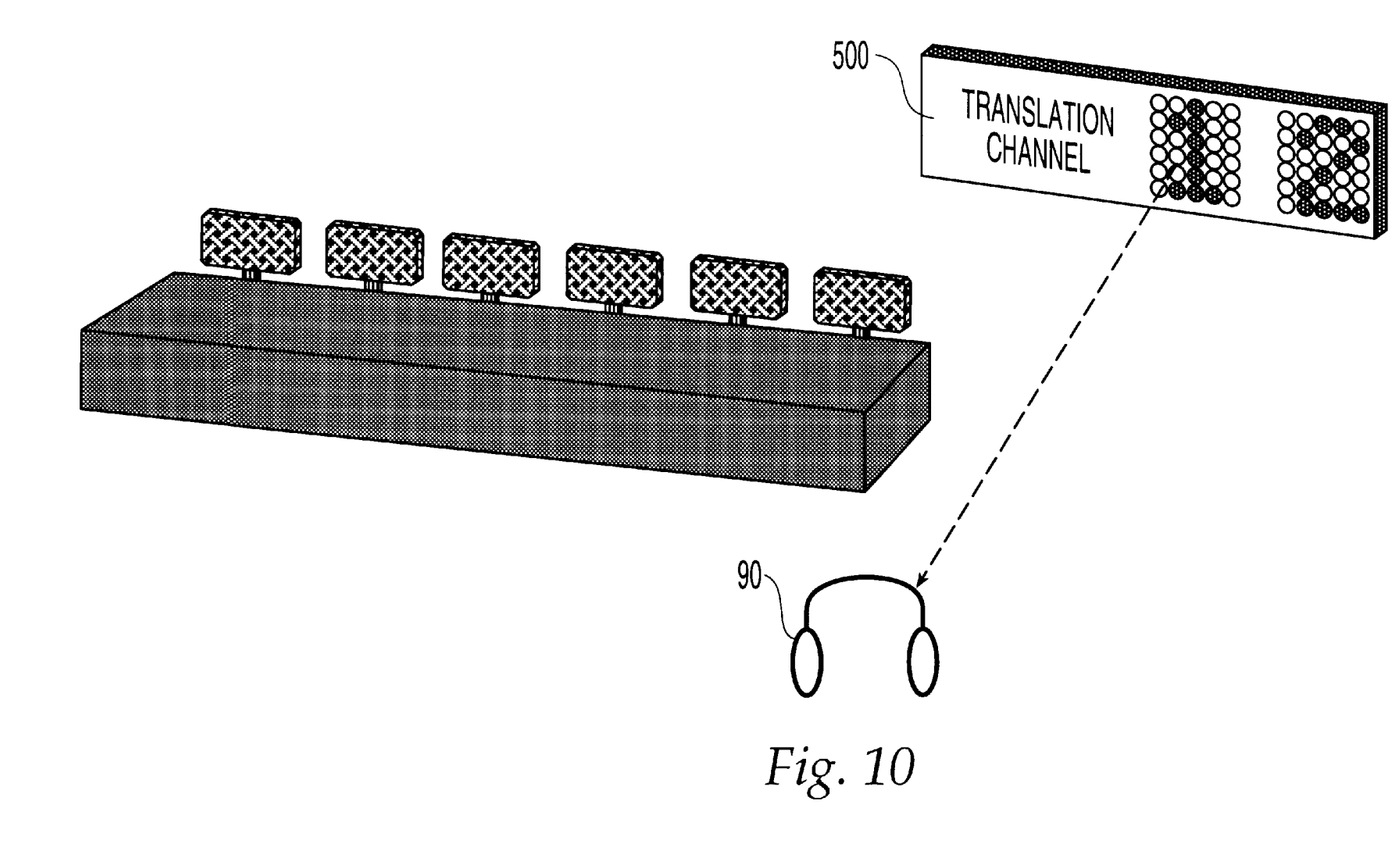
FIG. 10 is a perspective view of the LED dot matrix display system of the invention in a conference hall environment.

In a third application in a conference hall shown in FIG. 10 with simultaneous translation, the broadcasting of different channels of translations is carried out via different sets of LEDs 500. A user can tune to the desired channel by pointing the receiver to the relevant set of LEDs and listen to his channel from the headphone 90.

Figure 11:
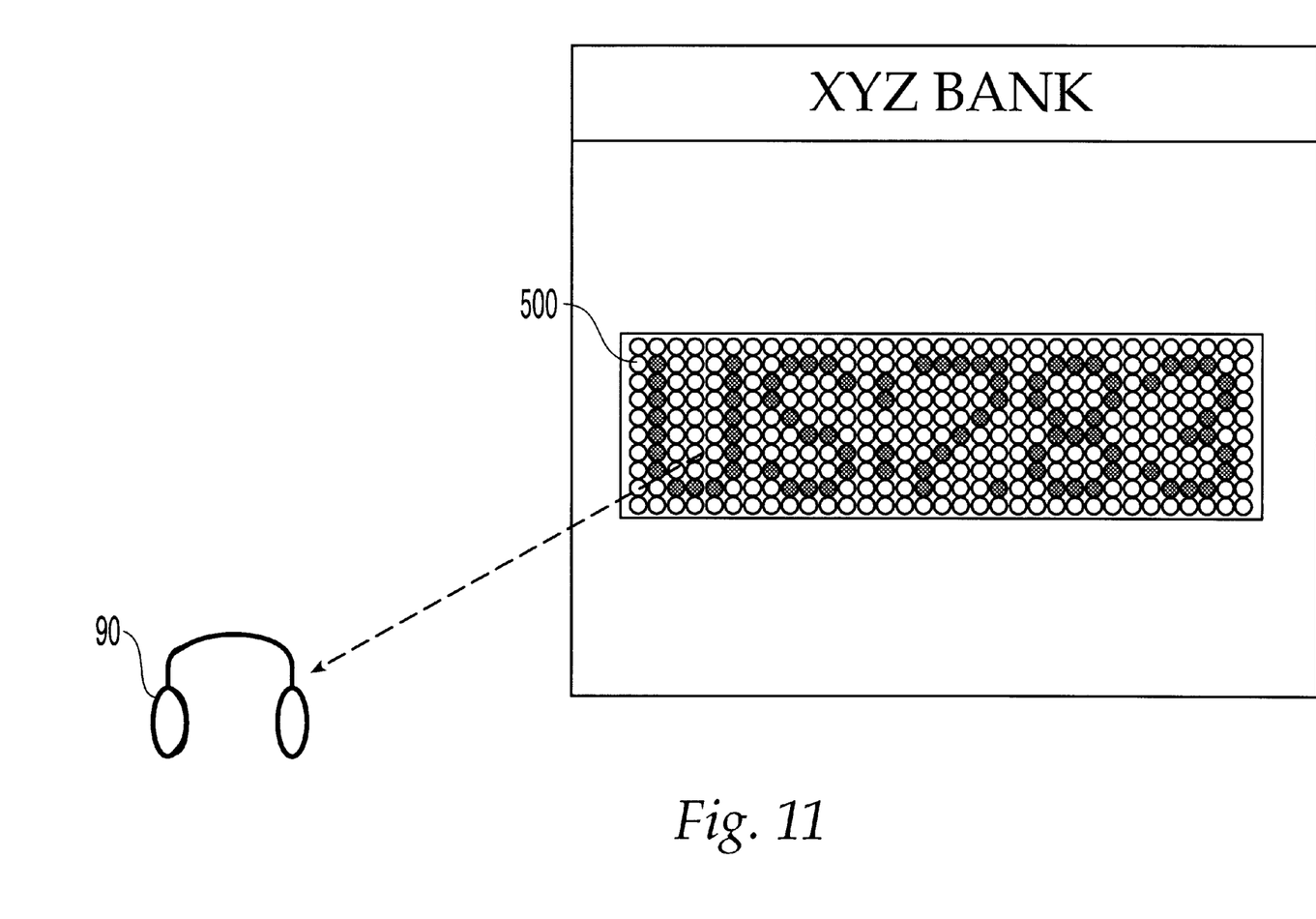
FIG. 11 is a perspective view of the LED dot matrix display system of the invention used outside a business or financial institution.

In a fourth application in front of a business or commercial institution as shown in FIG. 11, the light emitted from the dot matrix LED display 500 is used to optically transmit audio information to a user with a receiver and headphone 90 located some distance away from the institution. All commercial billboards can be used to transmit additional information such as daily specials, discount, latest attractions or any merchandise, reservation telephone number etc. for reservation purpose.

Figure 12:
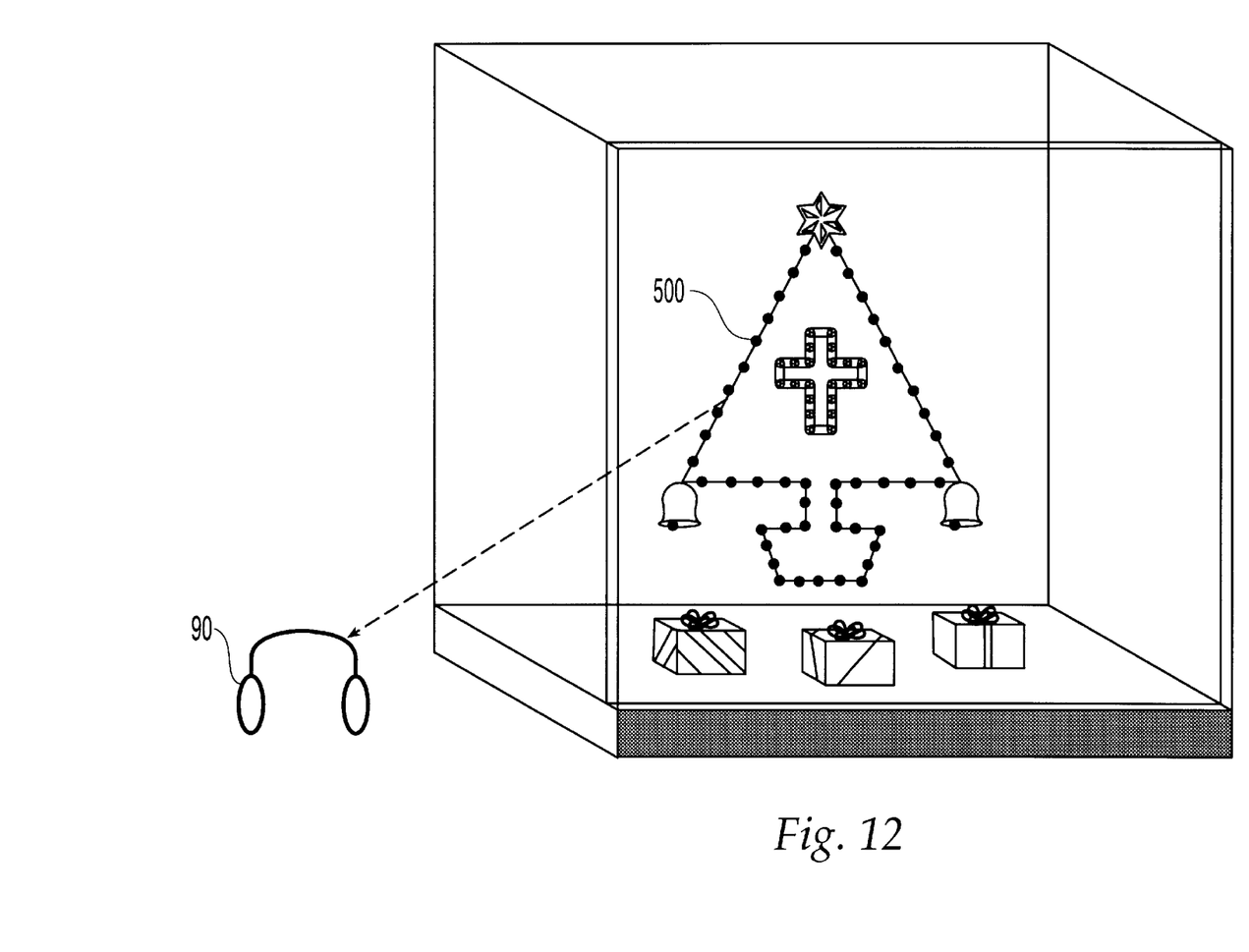
FIG. 12 is a perspective view of the LED dot matrix display system of the invention used inside a window display at a department store.

In a fifth application in front of a department store at a window display shown in FIG. 12, lights emitted from LEDs 500 of a decoration or display assembly is used to optically transmit audio information to a person equipped with a receiver and a headphone 90 in window shopping. The audio signal can contain music or advertisement messages.

While the preferred embodiment of the invention has been illustrated and described, it will be appreciated that various changes can be made therein within departing from the spirit and scope of the invention. It is therefore intended that the scope of the invention be determined solely from the following claims.

What is claimed is:

1. A light emitting diode dot matrix display system for simultaneously displaying a visual signal and transmitting an audio signal, comprising:
    a dot matrix display panel having a row and a column of light emitting diodes;
    an interface circuit connected to said dot matrix display panel, said interface circuit including a driver circuit for said light emitting diodes of said display panel;
    a visual signal display controller connected to said interface circuit for controlling display of said visual signal on said display panel;
    an audio signal transmitter connected to said interface circuit for providing a modulated audio signal to said light emitting diodes; and
    a receiver for receiving light emitted from said light emitting diodes and retrieving said audio signal therefrom;
    wherein said visual signal display controller comprises an executive program executed on a computer;
    wherein said interface circuit comprises:
        a system control block connected to a parallel port of said computer for providing a timing control and maintaining a count of pulses of said modulated audio signal;
        an address generator connected to said system control block for transforming frequency of said modulated audio signal to a scanning frequency for use in said row of light emitting diodes;
        a random access memory connected to said address generator for containing design information of said visual signal to be displayed on,the LED display panel;
        a PC data buffer connected to said parallel port of said computer;
        a column signal buffer connected between said address generator and said dot matrix display panel; and
        a row signal buffer connected between said random access memory and said dot matrix display panel.

2. The light emitting diode dot matrix display system according to claim 1, wherein said audio signal transmitter comprises a voltage-controlled oscillator for varying the frequency of ON/OFF periods of said light emitting diode.

3. The light emitting diode dot matrix display system according to claim 1, wherein said receiver comprises a photodiode for receiving light from said light emitting diodes and a demodulator connected to said photodiode for demodulating the light to retrieve said audio signal.

4. The light emitting diode dot matrix display system according to claim 1, wherein said system control block comprises a multiplexer and a counter, and said multiplexer selects the mode of operation between a display mode and a pattern storage mode for said interface circuit.

5. The light emitting diode dot matrix display system according to claim 1, wherein the transmitter comprises:
- at least one light emitting diode for producing visible light rays;
- a power source for said light emitting diode;
- means for coupling audio information to said light emitting diode; and
- a modulator connected to said light emitting diode for modulating the frequency of ON and OFF periods of said light emitting diode to transmit said audio information.

6. The light emitting diode dot matrix display system according to claim 1, further comprising an audio information source for providing said audio information.

7. The light emitting diode dot matrix display system according to claim 6, wherein said audio information source is a CD player.

8. The light emitting diode dot matrix display system according to claim 6, wherein said audio information source is a cassette tape-player.

9. The light emitting diode dot matrix display system according to claim 1, wherein said power source is a dc source with a voltage less than 10 volts.

10. The light emitting diode dot matrix display system according to claim 1, wherein said transmitter comprises a plurality of said light emitting diodes.

11. The light emitting diode dot matrix display system according to claim 1, wherein said modulator includes a voltage-controlled oscillator.

12. The light emitting diode dot matrix display system according to claim 1, wherein said transmitter further comprises a buffer circuit connected with said light emitting diode for driving said light emitting diode.

13. The light emitting diode dot matrix display system according to claim 1, wherein said transmitter further comprises an audio amplifier for amplifying said audio information before inputting said audio information to said demodulator.

14. The light emitting diode dot matrix display system according to claim 1 wherein said photodetector is a photodiode.

15. The light emitting diode dot matrix display system according to claim 1, wherein said receiver further comprises a lens system located before said photodetector for focusing said visible light rays onto said photodetector.

16. The light emitting diode dot matrix display system according to claim 1, wherein said receiver further comprises a speaker connected to said demodulator for broadcasting said audio information.

17. The light emitting diode dot matrix display system according to claim 1, wherein said receiver further comprises a headphone or ear jack connected to said demodulator for receiving said audio information.

18. The light emitting diode dot matrix display system according to claim 1, wherein said demodulator comprises:
- a limiting preamplifier connected to said photodetector for amplifying an electrical signal converted from said visible light rays by said photodetector;
- a virtual ground connected to said limiting preamplifier for biasing and comparison;
- a data reproducing circuit connected to said limiting pre-amplifier for producing rectangular pulses from said amplified electrical signal;
- a differentiator circuit connected to said data reproducing circuit for producing pulses acccording to said rectangular pulses;
- a pulse generator connected to said differentiator circuit for converting said pulses into sharp pulses;
- an integrator and envelope detector connected to said pulse, generator for demodulating said sharp pulses;
- a band-pass filter connected to said integrator and envelope detector for smoothing out signal distortions therefrom to produce said audio information; and
- a power amplifier for amplifying said audio information from said band-pass filter.

19. The light emitting diode dot matrix display system according to claim 1, wherein the receiver comprises:
- a photodetector for receiving said visible light rays emitted from said light emitting diode; and
- a demodulator connected to said photodetector for retrieving said audio information from said visible light rays.

* * * * *